United States Patent [19]

Rumble et al.

[11] Patent Number: 5,584,185
[45] Date of Patent: Dec. 17, 1996

[54] ENGINE POWERED ENERGY PROVIDING ASSEMBLIES

[75] Inventors: Ronald H. Rumble; Kenneth B. Smith; Robert C. Archibald; Frank W. Grigg, all of Queensland, Australia

[73] Assignee: Mishport Pty Ltd, Brisbane, Australia

[21] Appl. No.: 341,563

[22] PCT Filed: May 14, 1993

[86] PCT No.: PCT/AU93/00223

§ 371 Date: Nov. 15, 1994

§ 102(e) Date: Nov. 15, 1994

[87] PCT Pub. No.: WO93/23663

PCT Pub. Date: Nov. 25, 1993

[30] Foreign Application Priority Data

May 14, 1992 [AU] Australia ................................ PL2435

[51] Int. Cl.$^6$ ...................................................... F25D 19/00
[52] U.S. Cl. ............................ 62/115; 62/323.1; 62/295
[58] Field of Search ........................ 62/295, 240, 323.1, 62/115

[56] References Cited

U.S. PATENT DOCUMENTS

| | | | |
|---|---|---|---|
| 2,112,277 | 3/1938 | Euwer | 62/295 X |
| 2,257,374 | 9/1941 | Fritz | 62/295 |
| 2,543,541 | 2/1951 | Angle | 290/1 |
| 2,615,707 | 10/1952 | Rowe et al. | 267/1 |
| 3,218,820 | 11/1965 | Spatt | 62/295 X |
| 3,822,566 | 7/1974 | Lowi, Jr. | 62/240 X |
| 4,182,134 | 1/1980 | Viegas et al. | 62/323.1 X |
| 4,226,214 | 10/1980 | Palazzetti | 123/2 |
| 4,503,337 | 3/1985 | Häfner | |
| 4,527,071 | 7/1985 | Ausiello | |
| 4,736,111 | 4/1988 | Linden | 290/2 |
| 4,748,824 | 6/1988 | Wakabayashi et al. | 62/323.1 X |

FOREIGN PATENT DOCUMENTS 1157964  7/1966  United Kingdom.

Primary Examiner—William E. Tapolcai
Attorney, Agent, or Firm—Dvorak and Traub

[57] ABSTRACT

An energy providing assembly is powered by a water cooled internal combustion engine suspended within an enclosure by compliant springs and restrained by resilient snubbing means which limits movement of the suspended engine. Generating apparatus for generating mains specification electrical power and/or refrigeration apparatus, including a compressor, for refrigerating a coolant are fixed to and driven by the engine and are accessed by accessible coupling means which include a power outlet and plug-in coolant circuit connections. The refrigeration apparatus is arranged in heat exchange relationship with a coolant circuit associated with the coolant circuit connections whereby a remote fan coil unit may be installed by running conventional hoses to the apparatus and connecting to the coolant circuit connections.

11 Claims, 13 Drawing Sheets

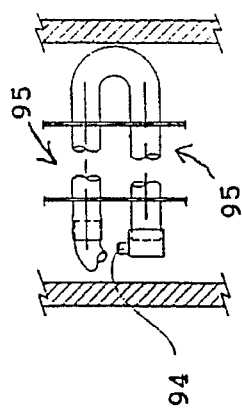
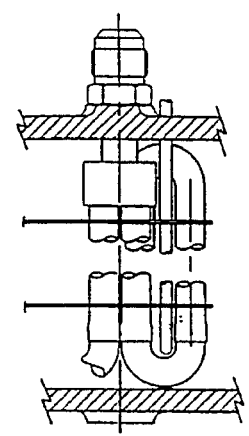
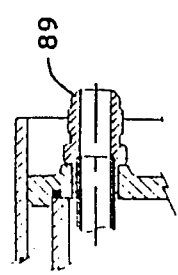
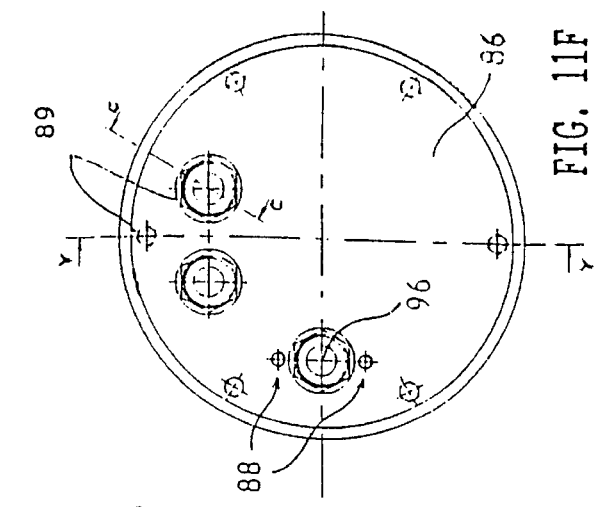
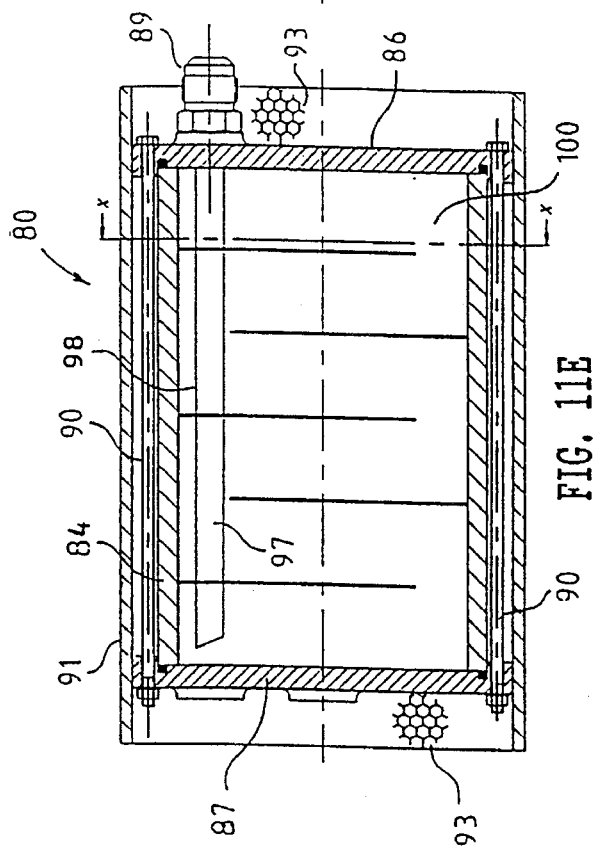
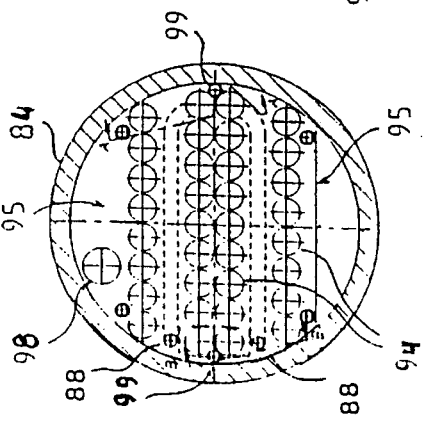

ENGINE POWERED ENERGY PROVIDING ASSEMBLIES

This invention relates to internal combustion engine powered energy providing assemblies.

This invention has particular reference to an energy providing assembly for supplying electrical power and/or coolant in such manner that electrical energy or coolant may be readily utilised for useful purposes such as in marine vessels and for illustrative purposes particular reference will be made to such application. Of course energy providing assemblies of the present invention could also be adapted to supply hydraulic fluid or mechanical energy and in regions where main power is not available, such as on islands and in remote areas.

Although many marine vessels are powered by diesel engines, it is often inappropriate to use relatively large propulsion engines to supply power for electrical appliances, refrigeration and air conditioning and the like when such vessels are at anchor. Such power requirements have traditionally been met by the use of diesel-powered generators to supply electricity to power the air-conditioning and refrigeration equipment. Such generators are typified as being bulky, heavy, and noisy and it is relatively inefficient to operate air conditioning and refrigeration from them.

Furthermore in recent years, the demand for sophisticated electrical appliances and comfortable living conditions on board vessels has extended progressively to smaller craft. However there is considerable difficulty in making such installations practical in terms of maintaining low vibration and noise on small vessels in particular. Such requirements are particularly difficult to meet where the further energy requirements are required as an aftermarket addition.

This invention aims to alleviate at least one of the above disadvantages and to provide internal combustion engine powered energy providing assemblies which will be reliable and efficient in use.

With the foregoing in view, this invention in one aspect resides broadly in an internal combustion engine powered energy providing assembly including:

a supporting assembly;

an internal combustion engine;

suspension means on said supporting assembly for operatively suspending said internal combustion engine;

energy providing means driven by said internal combustion engine for energising a utility, and accessible coupling means for coupling the utility to said energy providing means.

The utility may be, for example, an electrical appliance, air conditioning or cooling means or propulsion apparatus.

Preferably the energy providing means includes generating apparatus for generating electrical power, suitably alternating current at mains specification, and/or refrigeration apparatus for providing a coolant which may be a compressed refrigerant or a chilled liquid. Mains specification power shall be understood to be electrical power at the voltage and frequency specification, where applicable, of a selected location.

Alternatively the energy providing means could be a hydraulic pump or a coupling shaft for transferring mechanical power. It is also preferred that the internal combustion engine is a water cooled diesel engine but of course petrol powered and air cooled engines may be used if appropriate.

In a preferred embodiment of the invention the coolant apparatus includes a refrigeration compressor, a water-cooled condenser, a chiller/evaporator and a positive displacement circulating pump which may be mechanically driven from the engine and/or powered from an electric generator driven by the engine. It is also preferred that the suspension means includes compliant springs which suspend the engine and its associated driven equipment within the supporting frame assembly. The latter suitably includes an enclosure adapted to minimise radiated mechanical noise. In order to minimise complexity it is preferred that at least three compliant suspension springs depend within or from the supporting frame assembly in a convergent manner to laterally and longitudinally spaced spring mountings on the engine whereby the springs provide effective location of the engine and its associated driven equipment. It is also preferred that the suspension springs are length adjustable. The suspension means may also include snubbing means for limiting movement of the engine relative to the enclosure. For applications requiring particularly low noise levels, an outer enclosure is provided to co-operate with an inner enclosure so as to achieve noise levels below 55dBA.

The apparatus for providing a coolant may be any suitable conventional cooling means but preferably it includes a belt driven refrigeration compressor, a water-cooled condenser, an evaporator/chiller and a positive displacement circulating pump for circulating water based coolant through the evaporator/chiller. Preferably the coolant water chilled during passage through the evaporator/chiller is utilised as one form of energy providing means which may be circulated to fan-coil air conditioning apparatus and or refrigeration apparatus.

Suitably the engine is a water cooled diesel engine and the raw water cooling circuit for the engine is adapted to be regulated by bypass means to act as a cooling for the condenser but of course an independent water cooling circuit could be provided for the condenser. While the diesel engine could be raw water cooled it is preferred that the diesel engine be cooled by a fresh water circuit arranged in heat exchange relationship with the raw water circuit.

It is preferred that the coolant circuit is a recirculating circuit which includes coupling means in the form of conventional connections such as snap-on hose connections mounted externally of the supporting frame and forming supply and return connections for completing the recirculating coolant circuit. Of course where compressed refrigerant is the coolant the accessible connections could be Schroder valve type connections. Suitably however the coolant circuit is arranged to deliver chilled water based coolant at temperatures below freezing and suitably −2° C. and for this purpose the water based coolant contains ethylene glycol in the proportion of about 20% ethylene glycol. Thus the energy providing assembly may have simple reticulated water supply hose connections for the inlet and outlet of the recirculating coolant circuit. That is open connections not having valve means therein which automatically close the connection upon disconnection of an external circuit. Simple reticulated water supply hose connections may also be utilised for the raw water circuit to facilitate simple installation of the energy providing assembly. The coolant circuit may also be connected to refrigeration apparatus or air conditioning apparatus.

Such a coolant supply eliminates the need for external refrigerant piping connections and thus do not require a tradesman for effective installation. Of course refrigerant could be circulated in known manner if desired. Additionally the compressor may operate on R12 but preferably the system parameters are set to facilitate operation on R22 at R12 conditions.

The evaporator/chiller is suitably formed as to facilitate assembly from commercially available or readily manufactured components and in one embodiment with all joints being furnace brazed in one operation. It is also preferred that the chilled water circuit is baffled into a cross-flow configuration relative to the refrigeration tubes and so arranged that a high degree of turbulence is promoted in the water flow through the small clearances between the refrigeration tubes.

The internal combustion engine and/or the apparatus for generating electrical power may be manually or electrically controlled in known manner but preferably it is controlled by an electronic control system controlling starting and operation of the energy providing assembly. Suitably the coupling means comprises the only connections to the apparatus and the coupling means includes conventional plug-in connections for the supply of power therefrom and preferably these connections may be utilised as active connections for the electronic control system. Of course separate connections can be provided if desired.

The electronic control system is particularly adapted to:

provide an appropriate engine starting sequence so that the engine can be started manually or automatically as required;

sense when electrical power is required or coolant temperature rises above a datum level so as to initiate the start sequence and furthermore to sense when no load exists so that the engine can be shut down automatically, whereupon it remains on standby awaiting a power demand, and facilitate the automatic operation of multiple units in a cascade mode. This is required for applications where it is desired to provide electrical power and/or refrigeration beyond the capacity of a single internal combustion engine powered energy providing assembly in a multi unit installation and, at the same time, ensure that at any particular time only the necessary number of energy providing assemblies are operating.

This electronic control system utilises sensors to determine when an engine is running to inhibit further operation of the starter if that engine is running, and arms the engine monitoring and protection system. This provides protection in the event of failure of oil pressure and the like. Further the electronic control system may close the mains contactor on the generator to make power available at a selected interval after the engine operation is detected, such as at an interval of approximately six seconds.

The cascade function allows and facilitates two or more units to operate together, to start automatically and synchronise as the electrical load increases beyond the capacity of the one (or more) units running at the time. As the load fluctuates, the cascade function will start (or stop) the required number of units to match the load demand.

In another aspect this invention resides broadly in an evaporator/chiller which is suitably formed as to facilitate assembly from commercially available or readily manufactured components and in one embodiment with all joints being furnace brazed in one operation. It is also preferred that the chilled coolant circuit is baffled into a cross-flow configuration relative to the refrigeration tubes and so arranged that a high degree of turbulence is promoted in the coolant flow through the small clearances between the refrigeration tubes.

This invention also provides a method of providing refrigeration/air conditioning to a site, the method including:

providing an internal combustion engine powered energy providing assembly as defined above;

installing refrigeration/air conditioning plant at the site, said refrigeration/air conditioning plant being of the fan/coil type or equivalent type adapted to receive a supply of coolant;

operatively connecting supply and return lines between the accessible coupling means of the refrigeration apparatus provided in said internal combustion engine powered energy providing assembly and said refrigeration/ air conditioning plant, and operating said internal combustion engine powered energy providing assembly.

In order that this invention may be more readily understood and put into practical effect, reference will now be made to the accompanying drawings which illustrate a typical embodiment of the invention and wherein.

Figure 8:
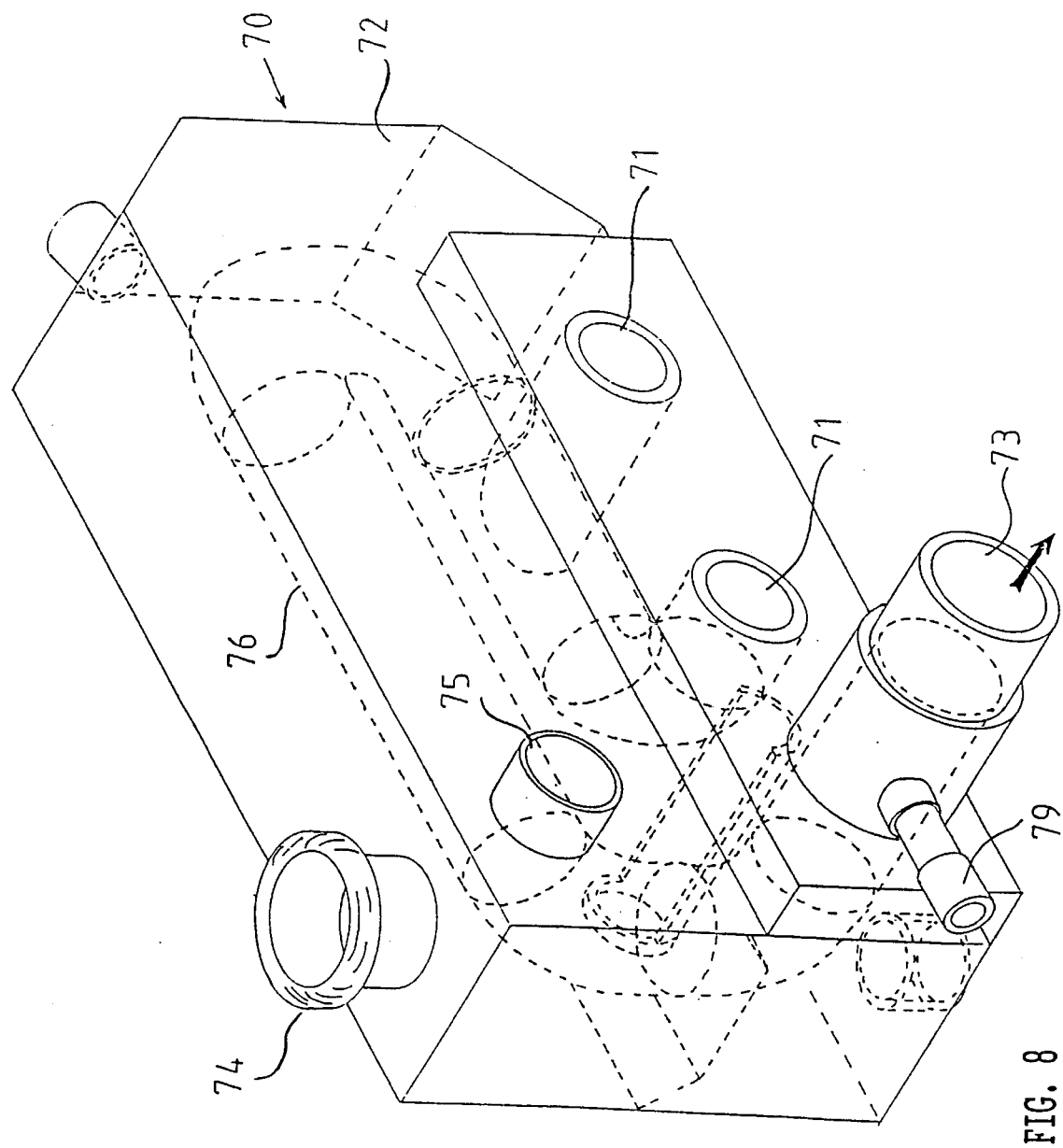
Figure 9:
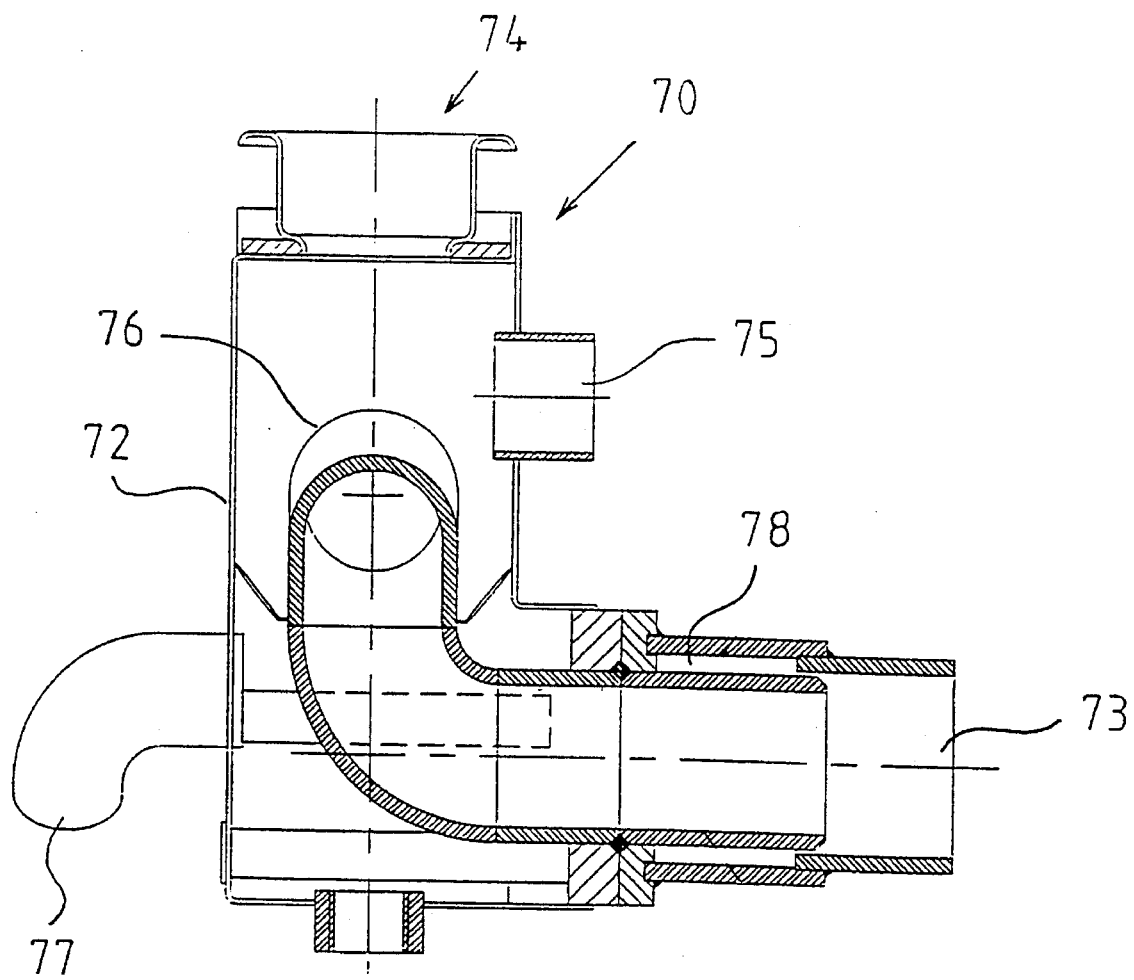
Figure 10:
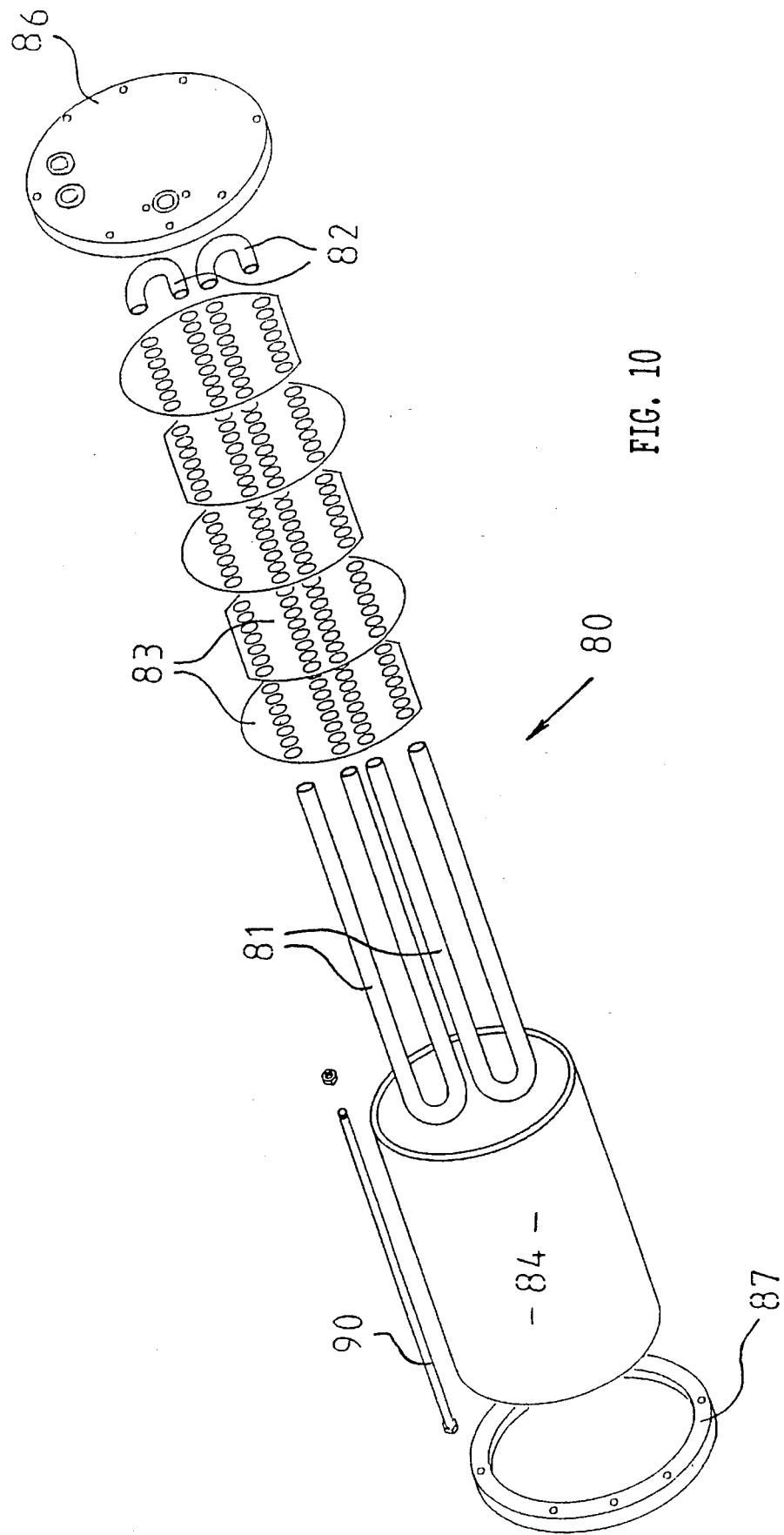
Figure 12:
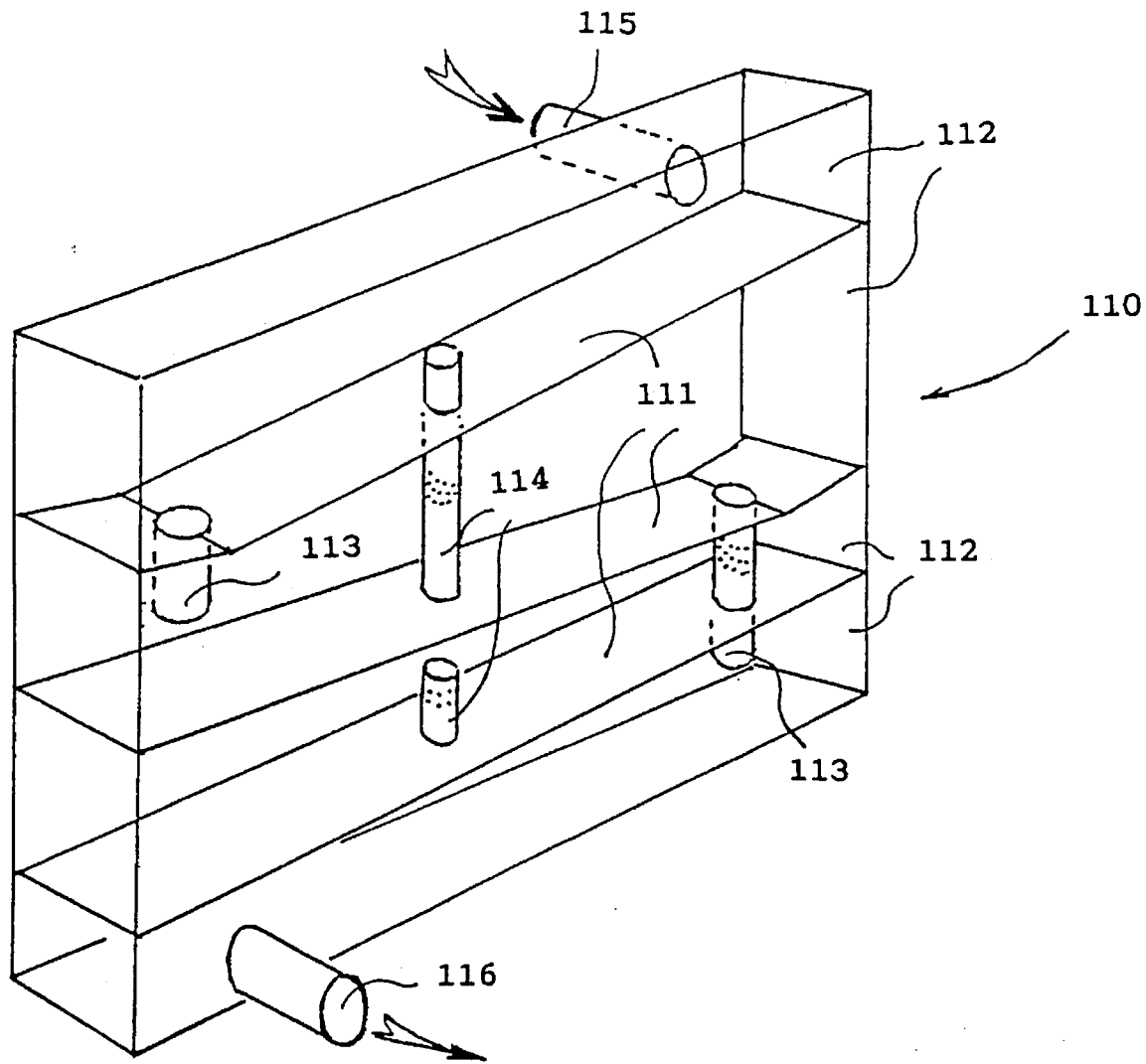

FIG. 8 diagrammatically illustrates a water cooler manifold for the diesel engine;

FIG. 9 is a cross-section of the manifold of FIG. 8;

FIG. 10 is a part exploded view illustrating a preferred construction of a water chiller;

FIGS. 11A–11F collectively illustrate various details of the water chiller of FIG. 10;

FIG. 12 illustrates various details of the engine muffler, and

Figure 13:
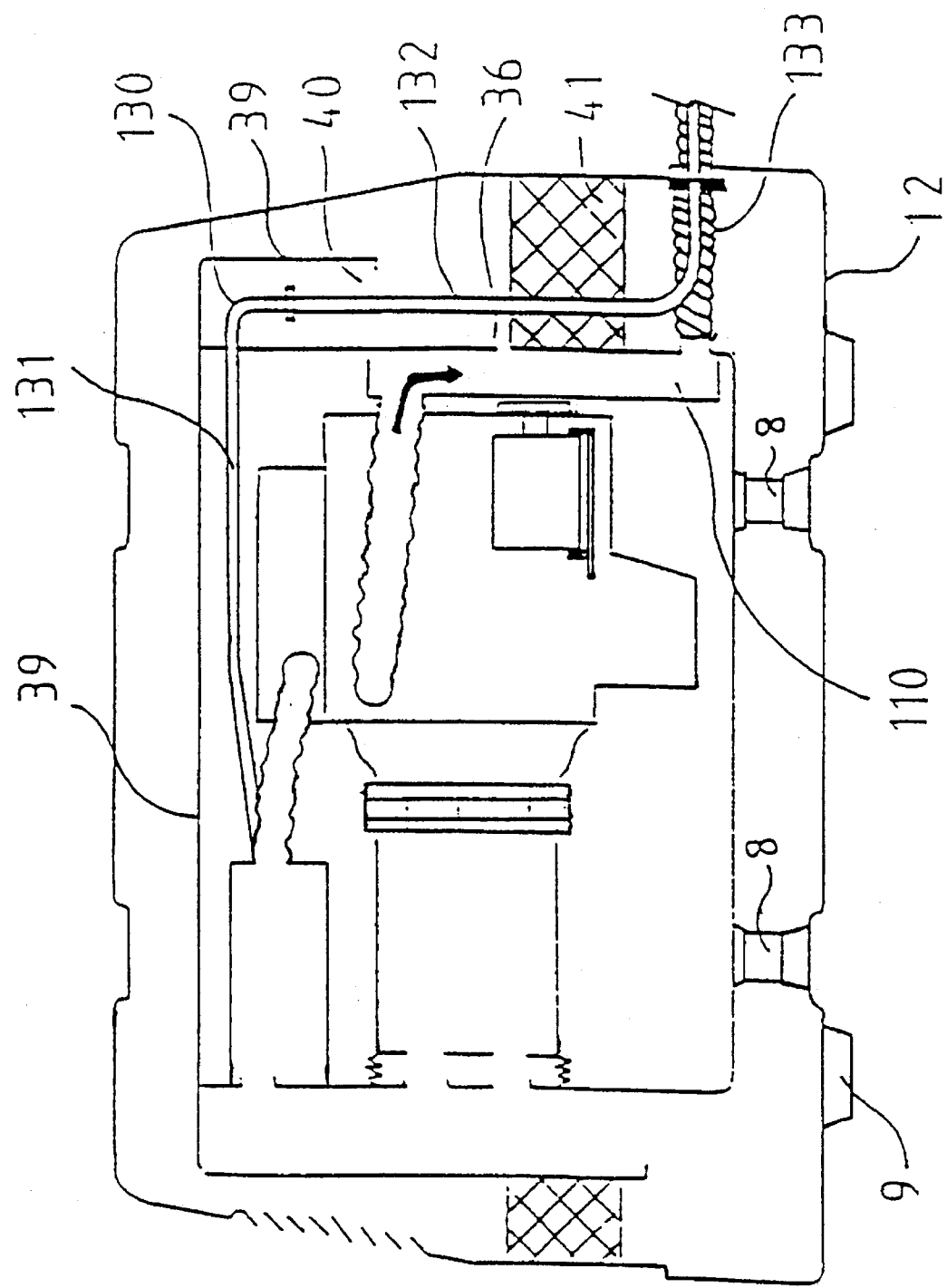

FIG. 13 illustrates an alternate mounting arrangement for the services connections.

Referring to the drawings it will be seen that the self contained energy providing assembly 10 has the external appearance of a vented housing 11 provided with a base 12 mounted on external isolation mounts 9 and removable upper covers 13 hinged to the base 12 by hinges 14 and latched together by latches 15. The covers 13 may be opened to permit the wall panels of the frame assembly to be removed to provide access to the working components of the assembly 10. These include a diesel engine 19 directly and rigidly mounted to a 240 volt alternator 16 and a belt driven refrigerant compressor 17.

Figure 3:
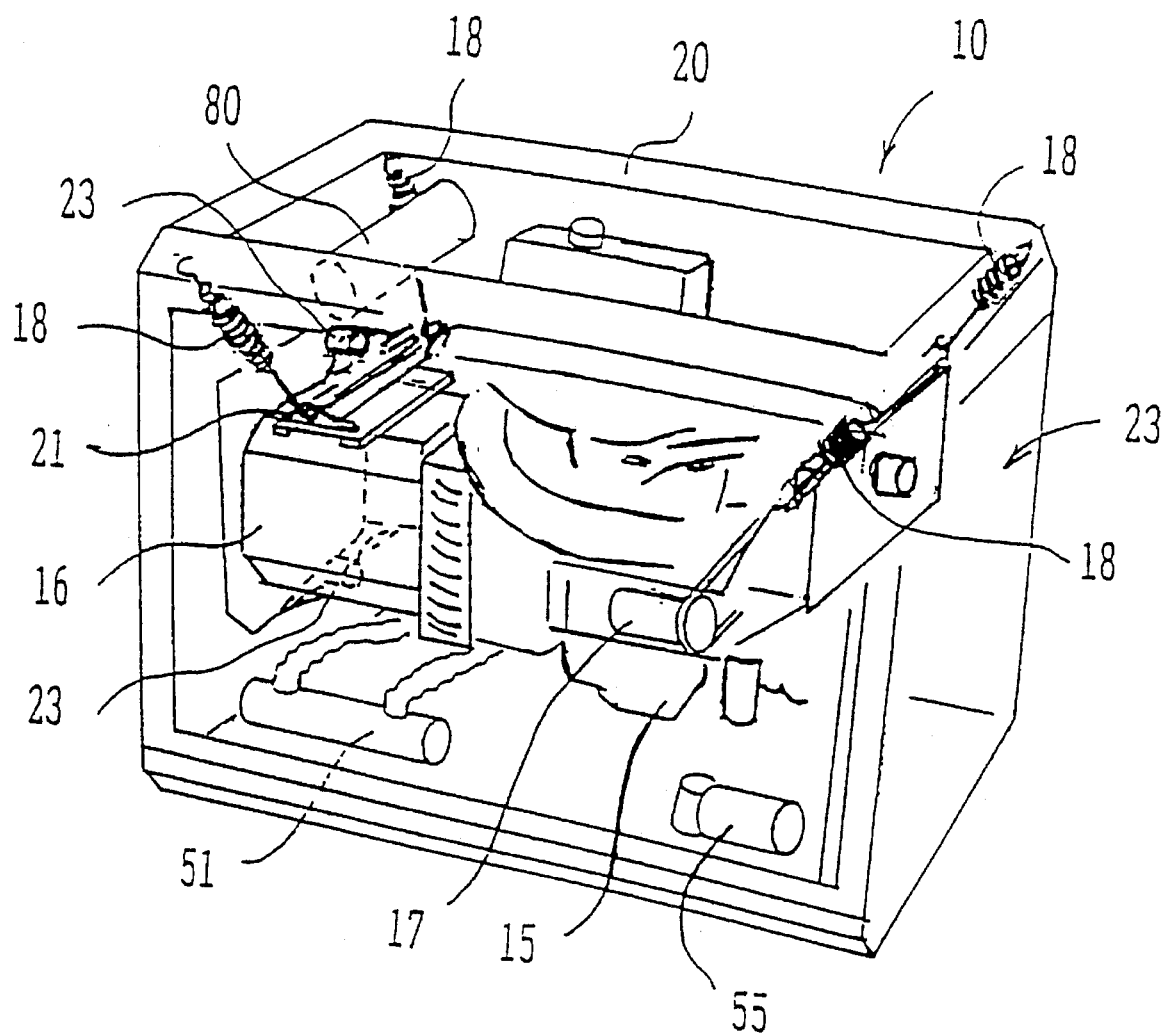
FIG. 3 illustrates diagrammatically the preferred form of suspension assembly.
Figure 5:
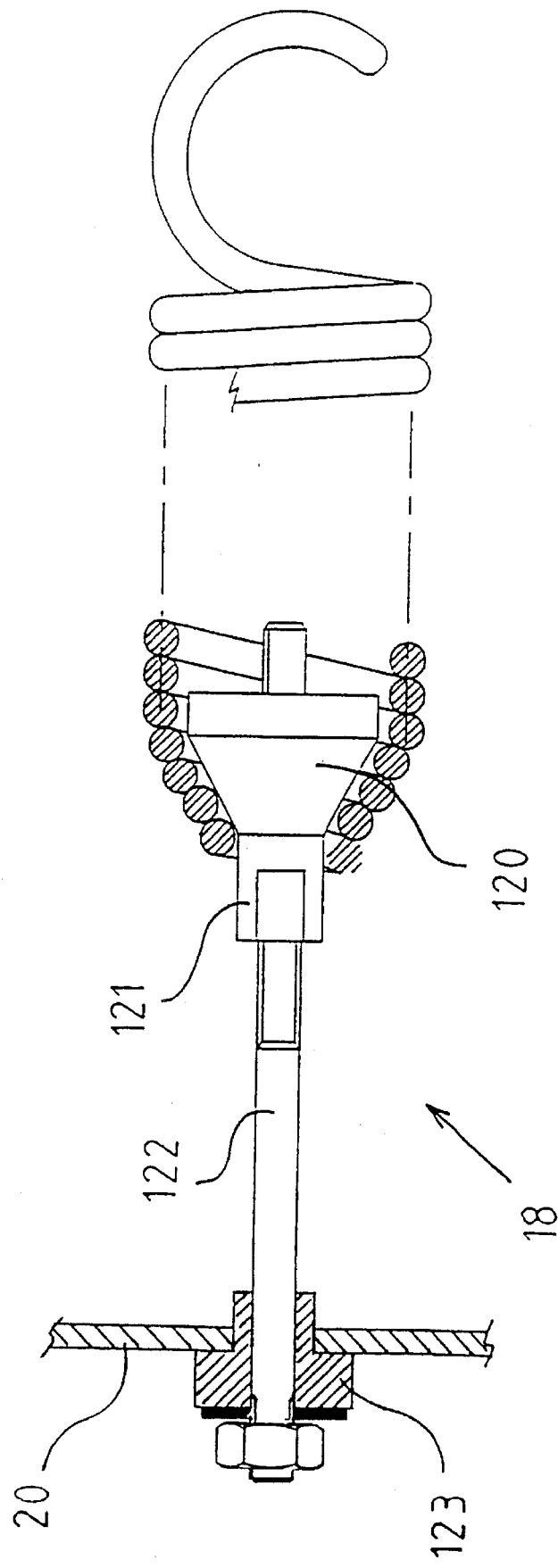
FIG. 5 is a cut-away view of the suspension spring.

Referring to FIG. 3 it will be seen that the engine/ alternator/compressor form a rigid unit 22 which is suspended by four coil springs 18 mounted to the upper corners of a rectangular perimeter frame 20 and extending downwardly and inwardly to longitudinally spaced pairs of laterally spaced mountings 21. The springs 18 are low compliance springs adapted to isolate vibration including low frequency vibration from the supporting frame 20. The springs 18 are length adjustable as illustrated in FIG. 5 and for this purpose include a tapered nut 120 held captive in the spring and having an extended portion 121 with spanner flats whereby the nut may be adjusted along the mounting stem 122.

In addition the mountings 21 are slotted to permit lateral and longitudinal adjustment of the lower ends of the springs. Furthermore the stem 122 passes through a stepped resilient bush 123 located in the perimeter frame 20 and forms an abutment for the retaining nut threaded on the stem 122. In this embodiment the springs are angled inwardly from the vertical in both the lateral and longitudinal direction at about twenty degrees. It is preferred that the spring mounting adjustment be so formed that the inclination of the springs is approximately equal to or greater than twenty degrees to the vertical so as to provide a desired amount of restraint in both the vertical and horizontal directions.

Figure 6:
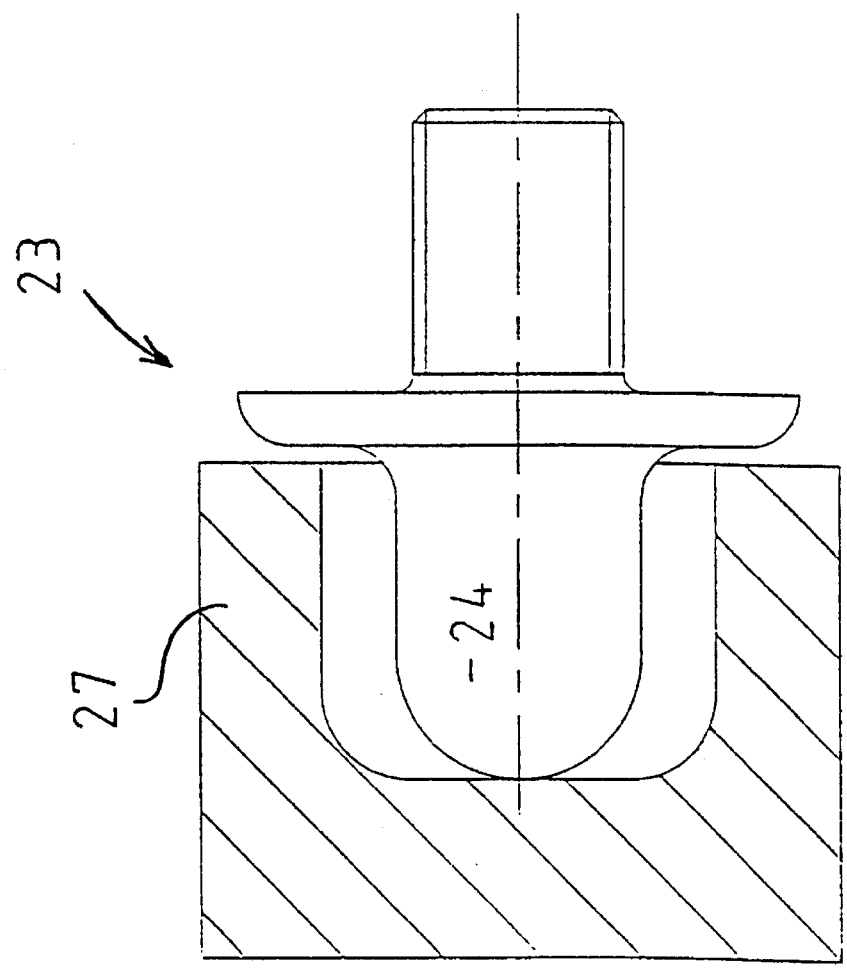
FIG. 6 illustrates a snubber for the suspension assembly.

In order to prevent excessive movement of the unit 22 snubber assemblies 23 are mounted at each end between the unit 22 and the frame 20. The snubber assemblies 23 limit the amplitude of movement of the unit 22 and as illustrated in FIG. 6 include a metal snubber pin 24 mounted rigidly to the unit 22 and adapted to nest loosely within a resilient snubber cup 27 fixed to the frame assembly 20. There are two vertically spaced snubber assemblies 23 at the alternator end of the assembly 10 and one centrally located snubber assembly 23 at the opposite end. The mounting springs 18 are length adjustable such that when the assembly 10 is placed in its operative position, which may be an inclined surface, they may be adjusted to centre the pins 24 within the cups 27. In addition, the rectangular perimeter frame 20 is supported on the base 12 by isolation mounts 8. These together with the isolation mounts 9 assist in the prevention of sound transmission to the surface upon which the energy providing assembly 10 is mounted.

Figure 2:
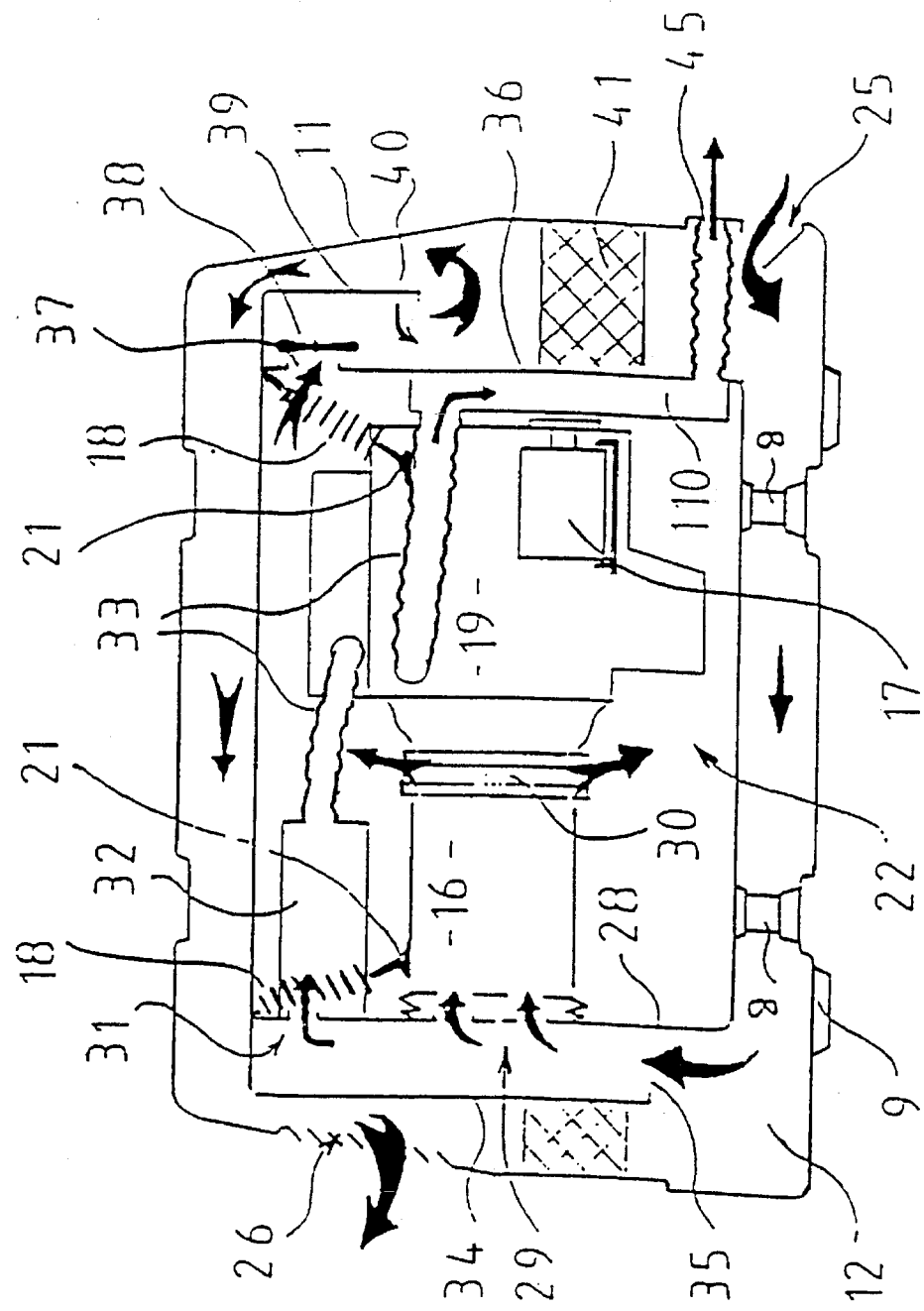
FIG. 2 is a typical cross-sectional view of the assembly illustrated in FIG. 1 and showing the housing and air-flow details.

As can be seen in FIG. 2 the housing 11 has an air intake 25 formed in the base 12 and an outlet vent 26 formed in each cover 13. The supporting frame 20 is adapted to be enclosed by respective side panels including a front end panel 28 which is apertured to provide inlets 29 to the alternator through which air is drawn and exhausted by the built-in fan through the alternator outlets 30. A further inlet 31 is provided in the front end panel 28 which communicates with an engine inlet attenuator 32 for supply of air to the engine 19. A cover 34 provided with a base opening 35 separates the inlets 29 and 31 from the outlets 26. The air and exhaust connections between the engine 19 and the frame assembly 20 are arranged as relatively long flexible hoses 33.

Figure 1:
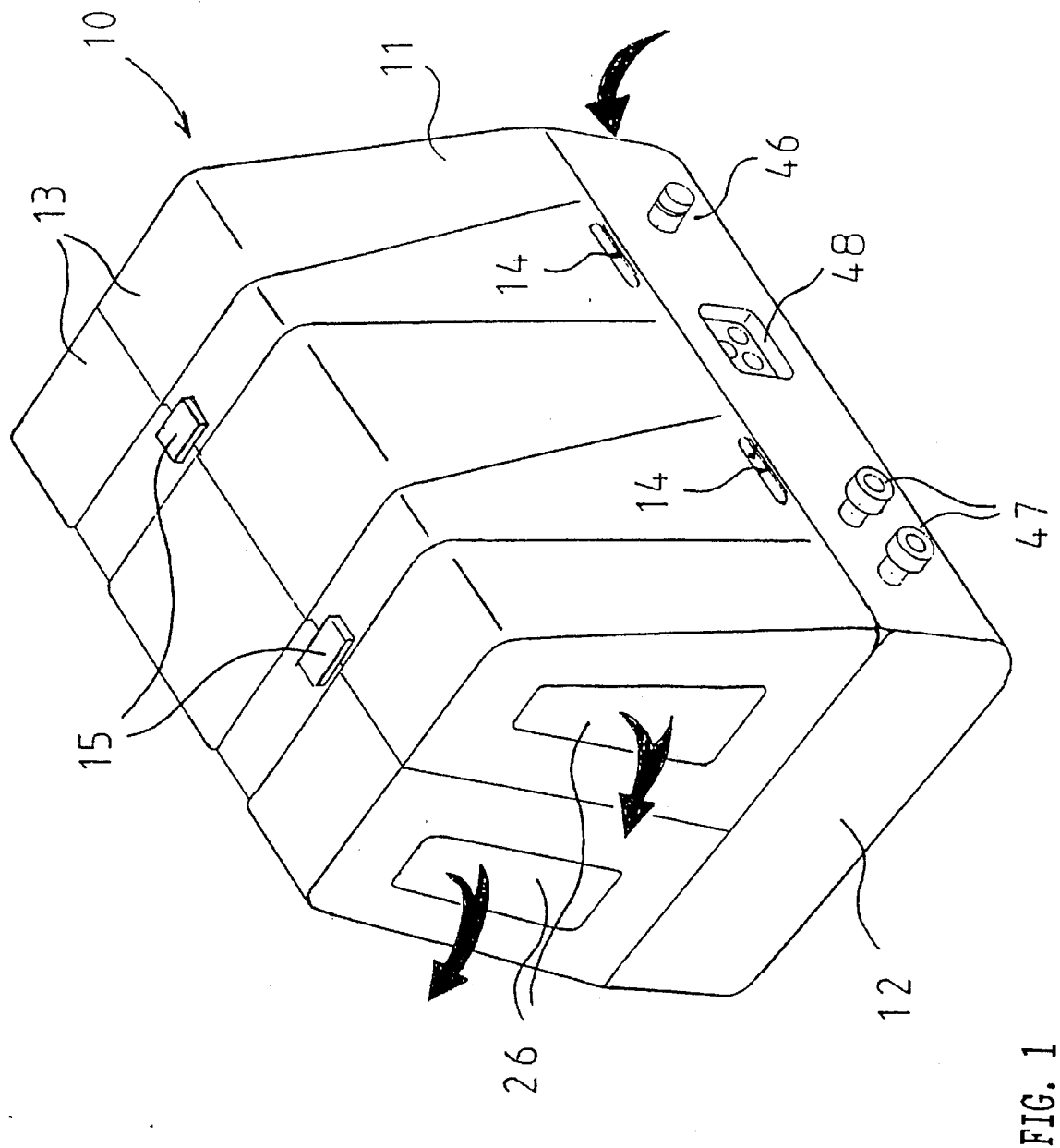
FIG. 1 is a perspective view illustrating a self-contained diesel engine powered assembly for providing electrical power and coolant.

The rear end panel 36 of the supporting frame 20 is provided with an outlet aperture 37 associated with an extraction fan 38 covered by a rear cover 39 which has a base opening 40. A sound attenuating baffle/seal 41 extends around the supporting frame 20 between its side and end panels and the housing 11. An exhaust connection 45 is formed in the base 12 through which the engine may exhaust. As illustrated in FIG. 1, a raw water inlet connection 46 is also provided in the base 12 as are snap-on inlet and outlet connections 47 for the coolant supply. In addition waterproof electrical outlets 48 are provided as indicated.

As shown in FIG. 2 air is taken into the housing 11 through the intake 25 and passes beneath the supporting frame 20 for passage to the inlet 29 to the alternator 16 and the inlet 31 to the engine attenuator 32. Air exhausted from the alternator 16 is extracted by the fan 38 and passes downwardly for circulation between the enclosed supporting frame 20 and the outer housing 13 for exit through the outlet 26.

The base 12 and the removable covers 13 as well as the wall panels for the support frame assembly 20 are lined with sound absorbing material such that a relatively quiet exhaust is emitted through the outlets 26. The supporting frame 20 may also support a battery for engine starting and the like but preferably external battery and fuel storage is utilized so as to minimise the need to access the interior of housing as such access may disturb seals and prevent maintenance of the sound reduction properties of the housing 11.

Figure 4:
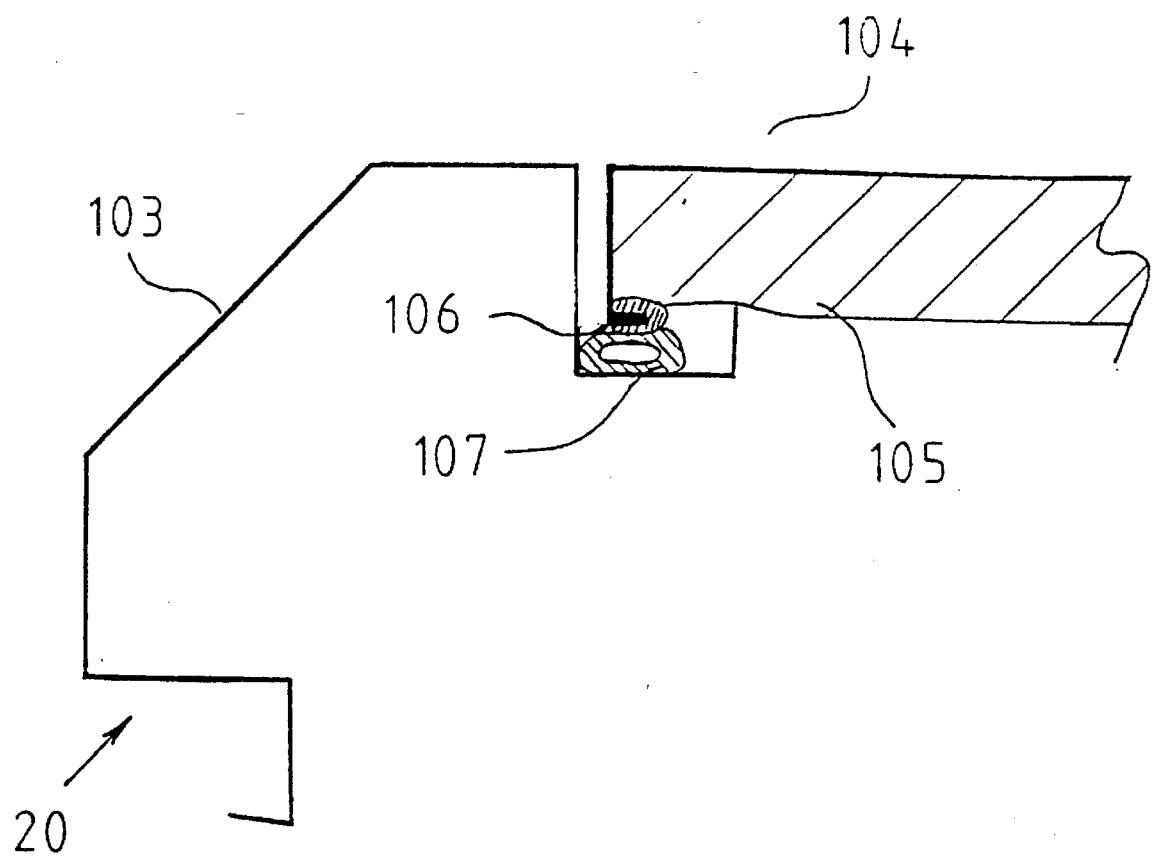
FIG. 4 illustrates details of the frame member sections and typical sealing and insulation details.

The frame assembly 20 is constructed from frame corner members 103 whose cross-section is as shown in FIG. 4. This provides structural strength and facilitates sealing for acoustic purposes and waterproofing, whilst being easy to manufacture and providing an effective external configuration. The wall panels, a removable top wall panel being illustrated at 104, support insulating material 105 and include a base flange 106 which seats on a flexible gasket 107 support on the frame member 103. The housing 11 is similarly sealed so that in effect the mechanical components are supported within two spaced insulated housings each of which is sealed, apart from the breathing passages provided.

Figure 7:
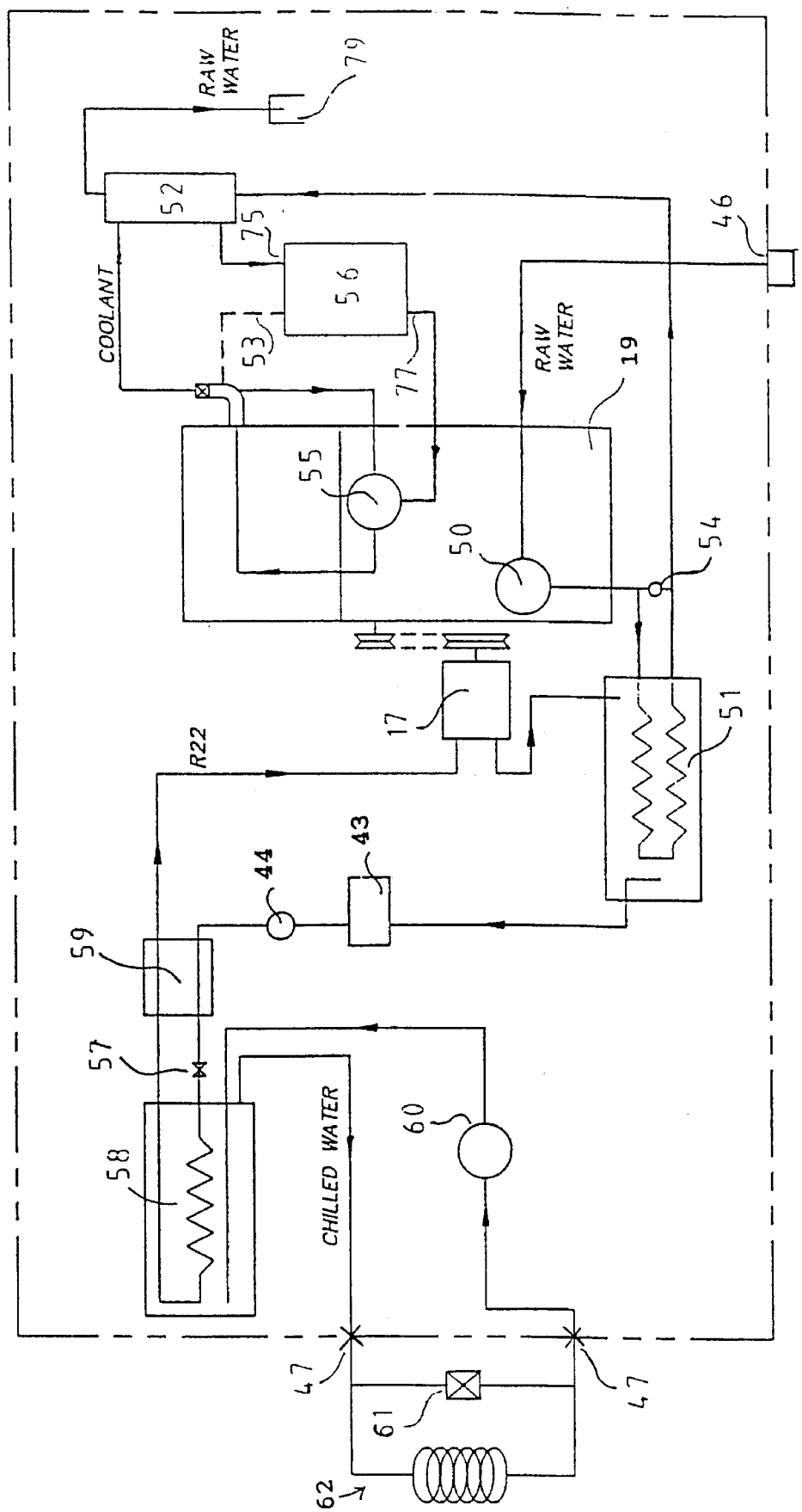
FIG. 7 is a fluids circuit diagram.

The fluids circuit is diagrammatically illustrated in FIG. 7. The assembly 10 has four distinct fluid circuits which interact to provide efficient operation while at the same time requiring minimum owner connections to be performed to install power and/or refrigeration/air conditioning in a vessel or remote building.

The fluid circuits include a raw water circuit which extends from the inlet 46 through a raw water pump 50, a condenser 51 and a heat exchanger 52 for final injection into the engine exhaust inlet 79. The engine exhaust gases pass through the outlet 45 as a wet exhaust. This circuit includes a bypass valve 54 which may be actuated to regulate the raw water flow through the condenser 51.

A second fluids circuit is the engine coolant circuit which is circulated by an engine coolant pump 55 through the engine coolant inlet 53, the heat exchanger 52 and the engine exhaust manifold 56. A waste heat bypass circuit 65 may be utilized to provide a heat source for external use such as for heating water or the like.

A third fluid circuit is the refrigerant circuit which passes from the compressor 17, which is belt driven from the engine 19 through a magnetic clutch whereby it may be operated and disconnected as required, and which supplies compressed refrigerant gas to the raw water cooled condenser 51 from which liquid refrigerant passes through a dryer 43 and sight glass 44 to an expansion valve 57, a chiller 58 and a heat exchanger 59 for return to the compressor 17.

The chiller 58 places the expanded refrigerant in heat exchange relationship with a fourth coolant circuit associated with the inlet and outlet connections 47. A water/ethylene glycol mixture containing about 20% ethylene glycol is circulated through this circuit by a pump 60 driven by an electric motor powered from the alternator 16 whereby coolant may be pumped and circulated independent of engine operation.

The coolant circuit is adapted to be connected to a remote fan coil assembly such as illustrated at 62 of known type and provided with a thermostatic bypass valve 61 whereby ambient temperature may be maintained at a desired level. The fan coil assembly may be utilised for air conditioning and/or refrigeration as desired, the coolant being maintained at a temperature of about −2° C. Suitable coolant temperature detecting means are provided to enable automatic operation, i.e. stopping and/or starting of the compressor or engine, as required.

FIGS. 7 and 8 illustrate the preferred form of water cooled engine exhaust manifold 70. As illustrated, the exhaust pipe from the engine exhaust inlets 71 circulates through a baffled water jacket 72 to an exhaust outlet 73. The water jacket has a coolant inlet 75 at which water enters the upper portion of the water jacket 72 for countercurrent passage over the internal exhaust pipe 76 which is surrounded by the baffle jacket 72 for discharge from an outlet 77. Water is circulated by the engine coolant pump 55 through the engine 19 for return to the inlet 75 via the heat exchanger 52. The configuration of the exhaust pipe 76 wherein the raw water inlet 79 and the exhaust inlets 71 are disposed below the upper run of the pipe 76 provides a trap preventing raw water passing from the raw water inlet 79 to the exhaust inlets 71. As illustrated in FIGS. 1 and 2, the raw water inlet 46 and the coolant connections 47 are all located at one side of the assembly 10 and adjacent the exhaust outlet 45.

As can be clearly seen in FIGS. 8 and 9 the exhaust pipe 76 terminates short of the exhaust outlet 73 which forms a water jacket concentric with the exhaust pipe 76 to provide a raw water injection chamber 78 into which raw water is injected from the injector inlet 79. The inlet 79 receives raw water from the outlet of the heat exchanger 52. The raw water passes to waste with the exhaust gases through the outlet 73. A jacket inlet 74 is provided for maintaining the appropriate coolant level in the engine coolant fluid circuit.

The chiller assembly 80 as illustrated in FIGS. 10 and 11 is fabricated from three main components, namely copper hairpin tubes 81, return bends 82 of the same radius (only two of which are shown) which interconnect the adjacent branch ends of adjacent hairpin bends 81 and baffle plates 83 which are cropped at one side to provide a coolant flow passage between the respective baffles 83 and the cylindrical shell 84. The cropped sides of the baffles 83 are arranged alternately at opposite sides of the shell 84 so as to form a circuitous coolant flow passage from one end of the shell 84 to the other.

The tubes 81 are assembled through a number of the cropped circular baffle plates 83 in two banks of tubes. In this embodiment each bank of tubes contains eight hairpin tubes 81 arranged in mirror image formation about the medial plane of the shell 84. These components are readily assembled and in one embodiment with all joints being furnace brazed after basic assembly of the components.

In each bank of hairpin bends, their medial planes are parallel and form an obtuse angle with the corresponding medial planes of those tubes 81 in the mirror image bank, the angle depending on tube diameter, the spacing between the hairpin tubes in each bank and the bend radius. The configuration is such that the return bends 82 are fitted to the ends of the adjacent hairpin tubes 81 to form two continuous parallel circuits at each side of the shell' medial plane. Details of this construction are shown in the sections illustrated.

The tube and baffle assembly is mounted as an assembled unit in a PVC shell 84 with metal end plates 86,87 sealing to the shell 84 on O-rings. The refrigeration connections 88 and the water based coolant connections 89 terminate through the end plate 86. The end plates are interconnected by draw bolts 90 and extend outwardly beyond the shell 84 to support an outer sleeve 91 in spaced relationship with the shell 84 and extending beyond the ends thereof to support insulation as illustrated at 93.

The connections 88 communicate through tubes 94 with respective ends of the opposed coil banks 95. The other ends of the coil banks 95 communicate with the single outlet 96 intermediate the inlets 88. The water based coolant connections 89 include an outlet connection which simply communicates with the chamber 100 adjacent the end plate 86 and an inlet connection which communicates with the opposite end of the chamber 100 through a tube 97 which passes through the baffle plates 83 as illustrated at 98. Further tubes 99 extend between the coil banks 95 to form side baffles for minimising flow between the opposed sides of the banks 95 and the shell 84.

It will be seen that the geometrical configuration of the cross-section enables larger capacity units to be constructed by simply increasing baffle and/or tube diameter. The shell 84 is made from PVC pressure pipe sealed by 'O' rings in bronze end plates 86. Insulation is provided by an air space achieved by mounting the shell 84 between end plates 86, insulated by insulation 93, inside a PVC outer tube 91.

FIG. 12 diagrammatically illustrates the arrangement of the exhaust muffler 110. It is a water cooled, multi-chamber reactive muffler. The chamber dimensions, post (connecting tube) configuration, sizes and position, are chosen to optimise noise attenuation. The internal baffling facilitates drainage of cooled water and it is made from a stainless steel which resists corrosion in warm salty water. It includes ramped dividing walls 111 forming separate chambers 112 and communicating drains 113. Additional interconnection between spaced chambers 112 is provided by the internal tubes 114. Wet exhaust flow is from the top inlet 115 to the bottom outlet 116 as illustrated.

FIG. 13 illustrates a preferred external hose connection arrangement. Downward facing piping elbows 120 for the piping 121 to connections 46 and 47 are arranged at the top of panel 36 beneath the removable cover 39. Hoses 122 can be inserted through sealed holes in the base 12 and extend upwards through the soft rubber seal 41 to the connections on the bottom end of the elbows. The arrangement minimises the number of hose connections required and provides flexibility between the inner enclosure 20 and the outer enclosure 11, including the flexible exhaust hose 123 so as to minimize the transmission of vibration and noise between the enclosures 20 and 11 whilst also providing access though concealed connections.

From the above it will be seen that the invention in one embodiment provides a diesel-powered alternator/chiller package which will alleviate many of the shortcomings apparent in existing equipment. Power is available on demand, whether the plant is attended or not due to automatic start-up by an electronic control system. Energy efficiency will be high and the package should be small and should not give rise to undesirable vibration or noise. Furthermore installation can be carried out by simply placing the assembly 10 in-situ, connecting the raw water inlet with a simple hose connection and similarly connecting a refrigerator coil or an air conditioner coil to the snap-on coolant connections 47 and/or heating connections from the waste heat circuit 53 if desired, with simple garden hoses or the like. When so installed and battery and fuel connections made, the unit will start-up automatically on demand of 240 volt power or when the coolant supply temperature falls below a selected lower limit.

It will of course be realised that the above has been given only by way of illustrative example of the invention and that all such modifications and variations thereto as would be apparent to persons skilled in the art are deemed to fall within the broad scope and ambit of the invention as is defined in the appended claims.

We claim:

1. An internal combustion engine powered energy providing assembly comprising:

a supporting assembly having an external enclosure;

an internal combustion engine;

a generating apparatus, said apparatus including a generator mounted on and driven by said engine, for generating mains specification electricity supply accessible by a connection on said supporting assembly;

a refrigeration apparatus that includes a compressor mounted on and driven by said engine and forming a closed refrigerant circuit within said external enclosure and arranged in heat exchange relationship with an open coolant circuit having at least one accessible connection on said supporting assembly externally of said external enclosure, said internal combustion engine, said generator and said compressor forming a rigid unit;

a compliant suspension means on said supporting assembly for operatively suspending said rigid unit, said compliant suspension means including a plurality of compliant suspension springs which suspend said rigid unit within said external enclosure and a snubbing means which limits longitudinal, transverse and rotational movement of said suspended rigid unit; and adjustment means for operatively centralizing said suspended rigid unit relative to said snubbing means.

2. An energy providing assembly as claimed in claim 1, wherein said suspension springs include at least three compliant tension springs extending downwardly in a convergent manner from said supporting assembly to said rigid unit to provide lateral and longitudinal location of said rigid unit.

3. An energy providing assembly as claimed in claim 1, wherein said suspension springs have length adjustable mountings which constitute said adjustment means.

4. An internal combustion engine powered energy providing assembly comprising:

a supporting assembly having an external enclosure;

an internal combustion engine;

a generating apparatus, said generating apparatus including a generator mounted on and driven by said engine, for generating mains specification electricity supply accessible by a connection on said supporting assembly;

a refrigeration apparatus, that includes a compressor mounted on and driven by said engine and forming a closed refrigerant circuit within said external enclosure and arranged in heat exchange relationship with an open coolant circuit having at least one accessible connection on said supporting assembly externally of said external enclosure, said internal combustion engine, said generator and said compressor forming a rigid unit, wherein said refrigerant circuit includes a chiller assembly that provides said heat exchange relationship with said open coolant circuit, said chiller assembly comprised of an elongate casing, end plates for sealably closing the casing, and a tube bank retained within the casing which is formed from a plurality of hairpin shaped tubes passing through a plurality of baffle plates arranged within said casing, wherein each of said hairpin shaped tubes are closely spaced together and have adjacent open tube ends, said tube ends interconnected together by a return bend, thereby providing a continuous coolant flow path through said tubes, wherein said hairpin tubes are arranged to cause the coolant flow through said tubes to be substantially transverse to said baffles, said tubes arranged within each of said baffles such that said baffles form a series of slotted walls, said flow transversing through each of said slotted walls; and electronic control means for controlling operation of one of said engine and said refrigeration apparatus, wherein said electronic control means provides an appropriate engine starting sequence so that the engine can be started one of manually and automatically as required, and which senses when electrical power is required and when coolant is required, said means also determining when a coolant temperature rises above a datum level so as to initiate the engine start sequence, and capable of sensing when no load exists to automatically shut down the engine and maintain the engine on standby until a next power demand.

5. An energy providing assembly as claimed in claim 4 and including an inner enclosure enclosing said rigid unit and spaced from said external enclosure and wherein defined air flow passages provide communication between the inner enclosure and the exterior of said external enclosure, said inner enclosure and/or said external enclosure being a sound insulated enclosure.

6. An energy providing assembly as claimed in claim 5 and including an engine muffler within said inner enclosure and exhausting through said external enclosure.

7. An energy providing assembly as claimed in claim 4 and including a coolant pump within said external enclosure powered by said energy providing assembly and controllable with the refrigeration apparatus for circulating coolant through said open coolant circuit.

8. An energy providing assembly as claimed in claim 4, wherein said refrigerant circuit includes flexible refrigerant hoses to and from said compressor.

9. An energy providing assembly as claimed in claim 4, wherein said externally accessible coolant connections are snap-on hose connections.

10. A chiller assembly constructed in accordance with claim 4.

11. A method of providing one of refrigeration and air conditioning to a site, the method comprising the steps of;

providing an internal combustion engine powered energy providing assembly, said assembly comprised of a supporting assembly having an external enclosure;

an internal combustion engine;

a generating apparatus, said generating apparatus including a generator mounted on and driven by said engine, for generating mains specification electricity supply accessible by a connection on said supporting assembly;

a refrigeration apparatus, that includes a compressor mounted on and driven by said engine and forming a closed refrigerant circuit within said external enclosure and arranged in heat exchange relationship with an open coolant circuit having at least one accessible connection on said supporting assembly externally of said external enclosure, said internal combustion engine, said generator and said compressor forming a rigid unit, wherein said refrigerant circuit includes a chiller assembly that provides said heat exchange relationship with said open coolant circuit, said chiller assembly comprised of an elongate casing having end plates for sealably closing the casing, a tube bank retained within the casing and comprised of a plurality of hairpin shaped tubes passing through a plurality of baffle plates arranged within said casing, thereby forming a circuitous path for the coolant, wherein each of said hairpin shaped tubes are closely spaced together and have adjacent open tube ends, said tube ends interconnected together by a return bend, thereby providing continuous flow paths through a plurality of said hairpin shaped tubes, wherein said hairpin tubes are arranged to cause the flow through said tubes to be substantially transverse to said baffles, said tubes arranged within each of said baffles such that they form a series of slotted walls, said flow transversing through each of said slotted walls; and electronic control means for controlling operation of one of said engine and said refrigeration apparatus, wherein said electronic control means provides an appropriate engine starting sequence so that the engine can be started manually and automatically as required and which senses when electrical power is required, and when coolant is required, said means also determining when a coolant temperature rises above a datum level so as to initiate the start sequence, and capable of sensing when no load exists to automatically shut down the engine and maintain the engine on standby until a next power demand;

installing a refrigeration/air conditioning means at the site, said means being of a fan/coil type which is adapted to receive a supply of coolant;

operatively connecting a supply and a return line between the accessible coupling means of the refrigeration apparatus provided in said internal combustion engine powered energy providing assembly and said refrigeration/air conditioning means, and operating said internal combustion engine powered energy providing assembly.

* * * * *